United States Patent [19]

Rings et al.

[11] Patent Number: 5,382,117

[45] Date of Patent: Jan. 17, 1995

[54] APPARATUS FOR HOLDING A POWDER CONTAINER

[75] Inventors: Friedel Rings, Monheim; Peter Holz, Duesseldorf, both of Germany

[73] Assignee: Henkel Kommanditgesellschaft auf Aktien, Duesseldorf, Germany

[21] Appl. No.: 182,199

[22] Filed: Mar. 28, 1994

[51] Int. Cl.$^6$ .............................................. B65G 53/24
[52] U.S. Cl. ...................................... 406/39; 222/105; 222/464; 222/180; 406/141
[58] Field of Search ............... 222/105, 180, 608, 630, 222/382, 464; 406/39; 137/590, 592; 248/75, 79

[56] References Cited

U.S. PATENT DOCUMENTS

| | | | |
|---|---|---|---|
| 2,793,073 | 5/1957 | Bateman | 222/382 X |
| 3,171,571 | 3/1965 | Daniels | 222/105 X |
| 3,188,146 | 6/1965 | Cordes | 222/630 |
| 3,951,462 | 4/1976 | De Francisci | 406/114 |
| 4,138,036 | 2/1979 | Bond | 222/105 |
| 4,505,623 | 3/1985 | Mulder | 406/141 X |
| 4,865,232 | 9/1989 | Cassady, Jr. et al. | 222/464 |

FOREIGN PATENT DOCUMENTS

| | | | |
|---|---|---|---|
| 0306126 | 12/1988 | Japan | 406/141 |
| 0147518 | 6/1990 | Japan | 406/141 |
| 8802503 | 4/1988 | WIPO . | |

*Primary Examiner*—Kevin P. Shaver
*Attorney, Agent, or Firm*—Ernest G. Szoke; Wayne C. Jaeschke; Kenneth Watov

[57] ABSTRACT

The invention concerns apparatus for holding a bag containing powder so that powder can be removed through a suction line. The invention enables a bag-shaped powder container to be held in a position permitting the powder to be sucked out by the suction line. This is achieved by using a trough-shaped or bucket-shaped container. The bracket has a gripper element which hangs from a horizontal support arm, and a suction-line holder. The support arm and the suction-line holder are each located at a height above the container such that, when a bag is placed in the container, the bag is gripped at one of its top corners by the gripper element and held upright. The suction line is held so that it passes down through the suction-line holder and passes freely through an opening, in particular a slit-shaped opening, in the top of the bag and into the powder.

4 Claims, 1 Drawing Sheet

APPARATUS FOR HOLDING A POWDER CONTAINER

This application is related to co-pending applications U.S. Ser. No. 182,110, filed Mar. 25, 1994, entitled DEVICE FOR PREPARING A STOCK WASHING LIQUOR; and U.S. Ser. No. 185,877, filed Mar. 28, 1994, entitled DEVICES AND METHOD FOR METERING POWDER DIRECTLY OUT OF THE SALE CONTAINER.

BACKGROUND

1. Field of the Invention

This invention relates to an arrangement for preparing a powder-containing bag for removal of the powder by means of a suction line.

2. Discussion of Related Art

It is known that a stock liquor tank containing a detergent solution can be provided for supplying institutional washing or dishwashing machines with the detergent solution. The detergent solution is pumped as required from the stock liquor tank into the washing or dishwashing machines. To prepare the stock liquor from a powder or powder-form detergent, a metering unit is associated with the stock liquor tank. The powder is poured into the metering unit from a powder container or the powder container as a whole is introduced into the metering unit and slit open. Powder-form detergent is delivered in batches from the metering unit into a dispensing trough in which it mixes with inflowing water to form the stock liquor forming the detergent solution for the washing or dishwashing machine. The stock liquor is then directly introduced into the stock liquor tank. The detergent solution is removed from the stock liquor tank in accordance with the requirements of the particular washing or dishwashing process.

Filling the metering unit with the powder-form detergent is not without problems. It is frequently accompanied by dust emission which is unpleasant and a health hazard to the machine operator, particularly in the case of the strongly alkaline detergent powders typically used for dishwashing. Unwanted dust emission can occur both during the introduction of powder containers into the metering unit and during the pouring or scooping of powder from the container into the metering unit.

The holding capacity of known metering units for supplying known stock liquor tanks with powder-form detergent is typically 5 kg so that only 5 kg powder containers can be accommodated in the metering units. In addition, the powder is normally removed from the metering units and the powder/water mixture delivered to the stock liquor tank under the effect of gravity. Accordingly, the metering units are normally arranged above a stock liquor tank. This prevents the holding capacity of the metering units from being increased as required unless holders of complicated construction are provided for the metering unit.

Accordingly, the problem addressed by the present invention is to enable the powder-form detergent to be directly transferred from the powder container to the stock liquor tank by means of a suction line. More particularly, the problem addressed by the invention is to enable the bag-like powder container to be kept in a position suitable for removable of the powder by means of a suction line.

SUMMARY OF THE INVENTION

In apparatus of the type mentioned above, these problems have been solved in accordance with the invention by a trough-like or bucket-like container with a gallows-like bracket which is associated with the container on one side and preferably arranged thereon, and which comprises a holding element preferably depending from a support arm and a guide for the suction line, the support arm and the guide for the suction line each being arranged at such a height above the container that, when it is placed in the container, the bag is gripped by the holding element at one upper corner, i.e. is held in an upright position, and, when it is introduced into its guide, the suction line is held—loosely guided—in a position in which it dips into the powder from above through an opening, more particularly a slot-like opening, in the bag.

The invention provides apparatus in which a powder-filled bag can be kept ready and prepared for emptying by means of a suction line in such a way that the powder can be completely removed from the bag independently and free from dust without any residues of the powder remaining behind in the bag.

The trough-like or bucket-like container is capable of accommodating 25 kg bags or, if made correspondingly larger, can even hold 200 kg bags so that the quantity of powder accommodated is considerably larger by comparison with conventional 5 kg metering units.

To ensure that, as the bag depending from the holding element empties, it assumes an inclined position with the lowest point at one corner of the bag, one embodiment of the invention includes the holding element fixed to the support arm or to the gallows-like bracket by a tension element exerting a tensile force, preferably a tension spring. The element exerting a tensile force, more particularly the tension spring, is adjusted in its tensile force in such a way that, as the sack is emptied, it is raised or pulled upwards at the upper corner where it is gripped by the holding element.

Another embodiment of the invention includes wheels or rollers are fitted to the base of the container. This enables the container to be moved, even with a bag on board.

BRIEF DESCRIPTION OF THE DRAWINGS

The invention is described by way of example in the following with reference to the accompanying drawing, in which like items are identified by the same reference designation, and of which the sole FIGURE shows a powder-filled bag placed in a trough- or bucket-like container with the suction line immersed therein.

The arrangement globally denoted by the reference 1 in the FIGURE consists of a trough- or bucket-like container 2 in which a powder container in the form of a bag 3 with powder-form detergent 4 accommodated therein is placed. The bag 3 may be a retail bag in which the powder 4 is sold. The trough- or bucket-like container 2 comprises a pivotally mounted carrying handle 5 and is fitted at its base with four rollers 6 so that the container 2 can be moved even with the bag 3 on board. A gallows-like bracket 7 is fixed to one side of the container 2. In the region of its gallows, the bracket comprises a support arm 8 to which a holding element 10 is dependingly fixed by means of a tension spring 9. The holding element 10 is attached to an upper corner of the bag 3 of powder. The support arm 8 and the holding element 10 fixed thereto are arranged at such a height on the bracket 7 that the bag 3 still completely filled with powder 4 and gripped by the holding element 10 is held in an upright position. In this position, the tension spring 9 is at least partly extended so that it is under tensile stress and exerts a tensile force. When the bag 3 is partly empty, it is raised by the holding element 10 under the tensile force exerted by the spring 9 so that the bag 3 moves into an inclined position with the lowest point inside the bag 3 situated diametrically opposite the gripping point of the holding element 10. The effect of this is that, when the powder-form detergent 4 is removed under suction from the bag 3, the suction lance globally denoted by the reference 11 and consisting of a suction tube 12 and a surrounding tubular jacket 13 moves into the lowest corner of the bag 3 as the bag emptying process continues. This ensures independent and complete emptying of the bag 3. The suction lance 11 is flanged onto one end of a suction line 15 by means of a flange 14. The powder 4 is transported under suction to its destination through the suction line 15.

Figure 1:
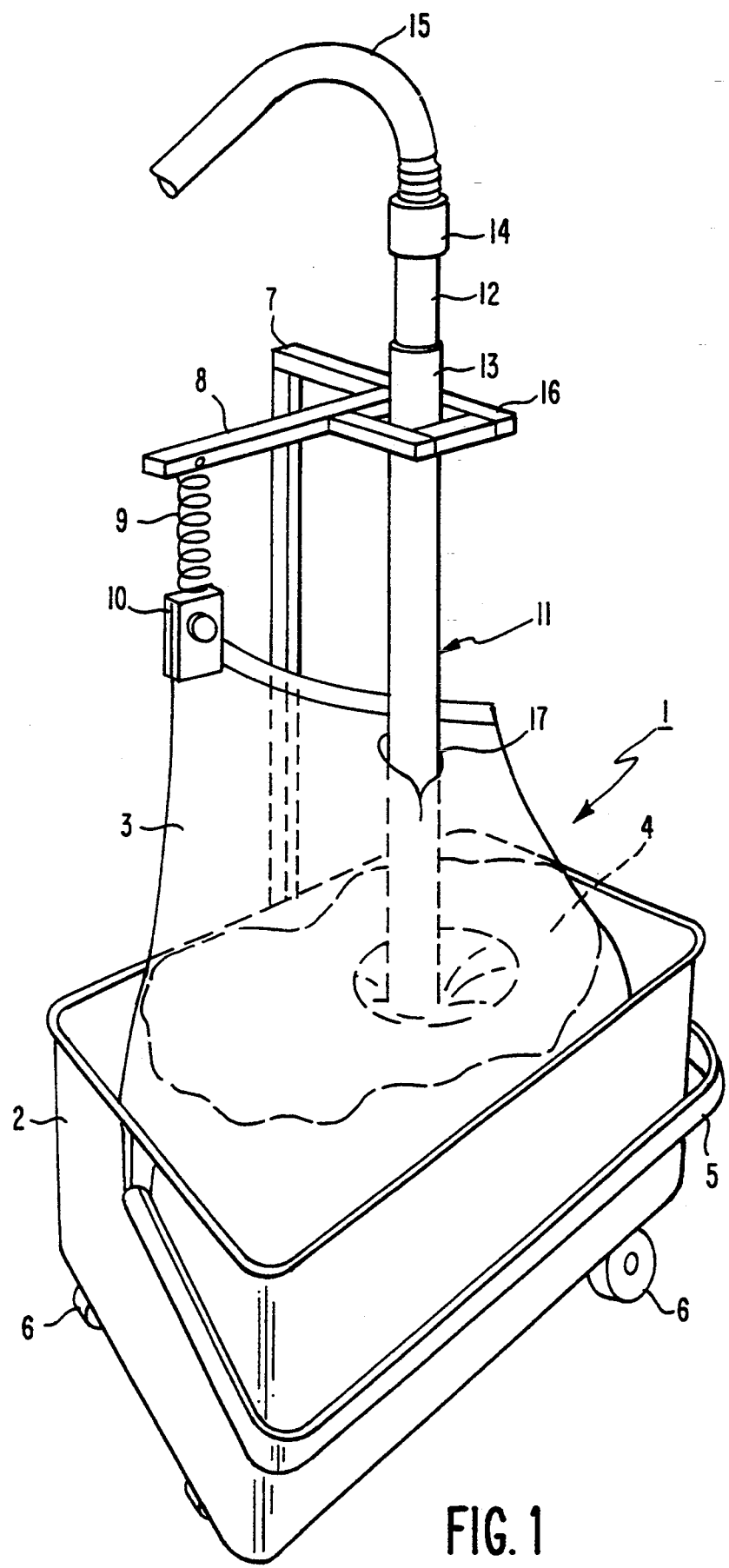

In addition, the bracket 7 in the region of its gallows comprises a guide 16 for the suction lance 11 by which the suction lance 11 is held in a vertical position. The guide 16 is arranged at such a height on the bracket 7 that the suction lance 11—loosely guided and supported by the guide 16—is held in a position in which it dips into the powder 4 from above through an opening 17, more particularly a slot-like opening, in the bag 3.

The gallows-like bracket 7 does not necessarily have to be fixed to the trough-like or bucket-like container 2 and may merely be associated therewith. For example, the bracket 7 may even be fixed to a room wall and its association with the container 2 established simply by pushing the container under the bracket 7 until it is close to the wall. Nor does the guide 16 for the suction line have to be fixed to the bracket 7. Instead, the frame of the guide 16 surrounding the suction lance 11 may be provided on one side with an outwardly projecting eye which surrounds the element exerting the tensile force or the tension spring 9. In this way, the guide 16 for the suction lance 11 is held loosely on the tension spring 9, thus enabling the tension spring 9 to slide in the eye and hence providing for relative displacement between the guide 16 and the tension spring 9 or the holding element 10 and the bag 3 during emptying of the bag. The suction lance 11 thus stands in the powder 4 and is prevented from tipping over by the eye—surrounding the tension spring 9—of the suction line guide 16 supporting the suction lance 11.

What is claimed is:

1. Apparatus for preparing a bag containing powder for removal of the powder by means of a suction line, said apparatus comprising:
   a bucket-like container for holding said powder bag, said container including sides and a base;
   a gallows-like bracket attached to one side of said container, said bracket including:
   a guide loosely surrounding said suction line;
   an extending support arm;
   a holding element attached to a free end of said support arm;
   said support arm and guide being arranged at a height above said container with said bag being held at an upper corner by said holding element for holding said bag in an upright position, whereby said suction line is retained loosely guided by said guide in a position permitting said suction line to enter said bag through an opening therein and dip into the powder in said bag.

2. An apparatus as claimed in claim 1, further including wheels attached to an underside of the base of said container.

3. An apparatus as claimed in claim 1, further including said holding element being fixed to the support arm by a tension element exerting a tensile force.

4. Apparatus as claimed in claim 3, wherein said tension element consists of a tension spring.

* * * * *